April 5, 1955   A. R. CHASAR   2,705,642
ROTATABLE CLAMPING ASSEMBLY
Filed Dec. 2, 1952   2 Sheets-Sheet 1

INVENTOR
Anthony R. Chasar
BY Evans + McCoy
ATTORNEYS

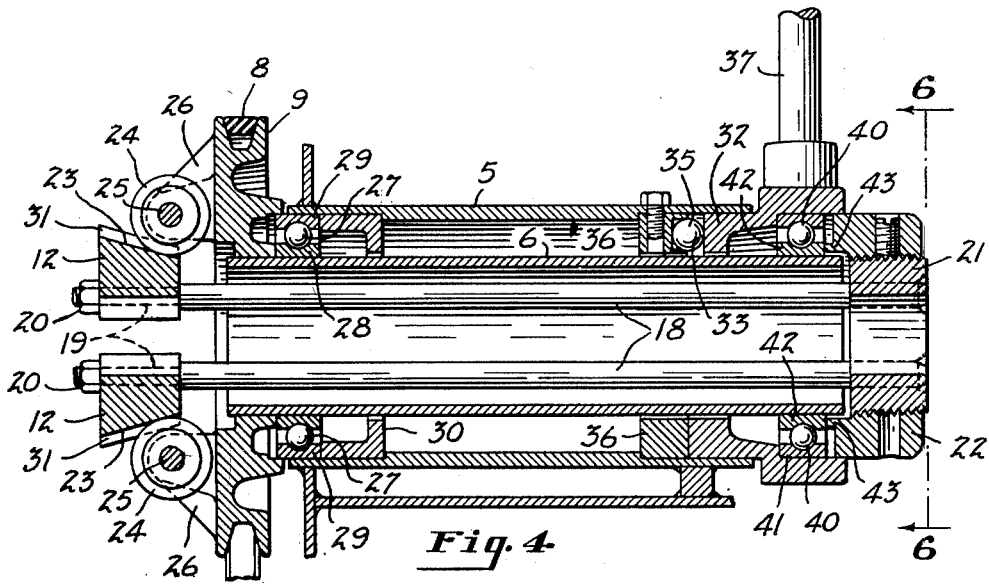
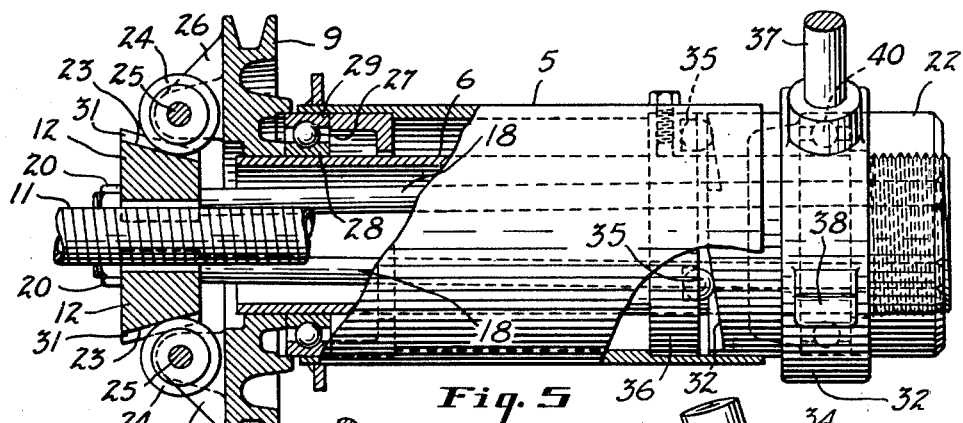
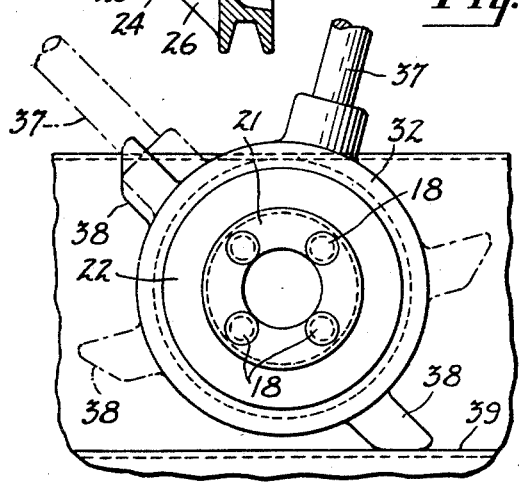
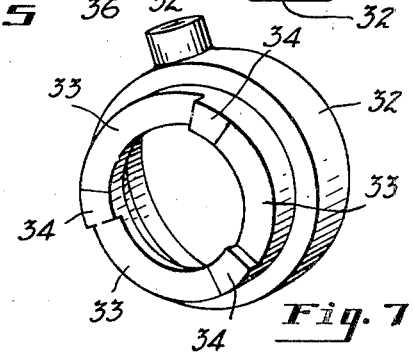
INVENTOR
Anthony R. Chasar
BY Evans + McCoy
ATTORNEYS

United States Patent Office 2,705,642
Patented Apr. 5, 1955

2,705,642

ROTATABLE CLAMPING ASSEMBLY

Anthony R. Chasar, Cleveland, Ohio, assignor to The Oster Manufacturing Company, Cleveland, Ohio, a corporation of Ohio Application December 2, 1952, Serial No. 323,667

20 Claims. (Cl. 279—51)

This invention relates to rotatable clamping assemblies and more particularly to a clamping assembly including a rotary power driven tubular shaft through which the member to be clamped may extend.

The device of the present invention comprises a supporting shaft and a clamping unit that rotates with the shaft, that is movable axially with respect to the shaft and that has clamping members that are moved to and from clamping position upon axial movement of the unit with respect to the shaft.

The clamping assembly of the present invention is suitable for clamping and releasing an elongated member such as a flexible or rigid shaft or a flexible or rigid workpiece at successive points along its length during intervals between advancing movements of the member.

The clamping unit includes clamping jaws in the form of blocks that are attached to the free ends of elongated and flexible resilient rods that can be flexed laterally and means is provided for camming the clamping blocks radially when the clamping unit is moved axially with respect to the supporting shaft.

Objects of the invention are to provide a rugged clamping assembly of simple and relatively inexpensive construction and to provide a manually operable actuator that acts directly upon the clamping members to apply or release the clamping members and that can be operated during rotation of the assembly.

Reference should be had to the accompanying drawings forming a part of this specification in which:

Fig. 4 is a fragmentary, longitudinal section taken on the line indicated at 4—4 in Fig. 2;

Fig. 5 is a fragmentary view partly in side elevation and partly in longitudinal section showing the clamping unit in clamping position;

Fig. 6 is a rear elevation of the head showing the clamping actuating cam and the operating lever and stops attached thereto; and Fig. 7 is a perspective view of the sleeve cam which actuates the clamping unit.

Figure 1:
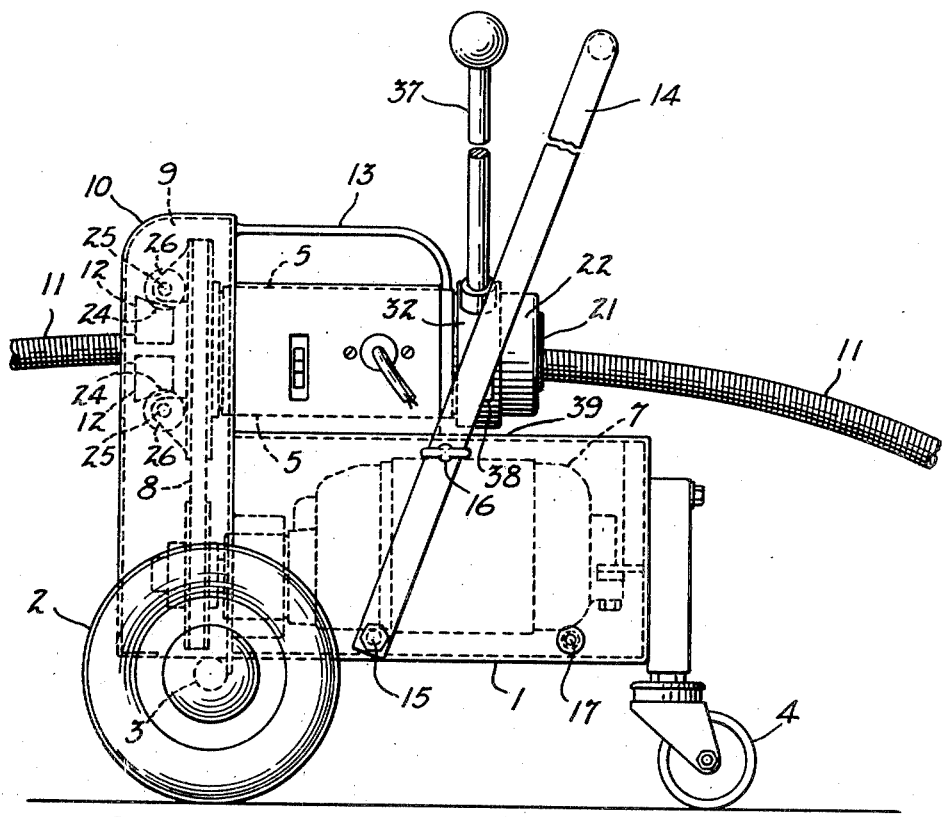
Figure 1 is a side elevation of a portable power unit to which the invention is applied.

In the accompanying drawings the invention is shown applied to a portable power unit suitable for driving a flexible shaft or snake such as used for sewer cleaning. The power unit is in the form of a carriage, the body of which forms a motor housing 1 and which is supported on front wheels 2 carried by a cross axle 3 and a single rear caster wheel 4. Upon the top of the motor housing 1 there is mounted a head 5 in which is journaled a horizontal tubular shaft 6 that is driven by a motor 7 in the housing 1 through a belt 8 and a pulley 9 attached to the forward end of the shaft 6, a suitable guard 10 being provided for the belt 8 and pulley 9.

A flexible shaft or snake 11 is shown extending through the head 5 and this shaft is adapted to be gripped by a pair of clamping blocks 12 adjacent the forward end of the shaft 6. When the device is being used as a sewer cleaner the carriage is moved forwardly while the shaft 11 clamped to the driven shaft 6 by the clamping blocks 12 is advanced into the sewer pipe. After the carriage has been moved forwardly to a position close to the sewer opening, the clamp is released and the carriage is backed away and again clamped to the shaft 11, thus feeding as much of the shaft 11 as desired into the sewer.

Figures 2, 3:
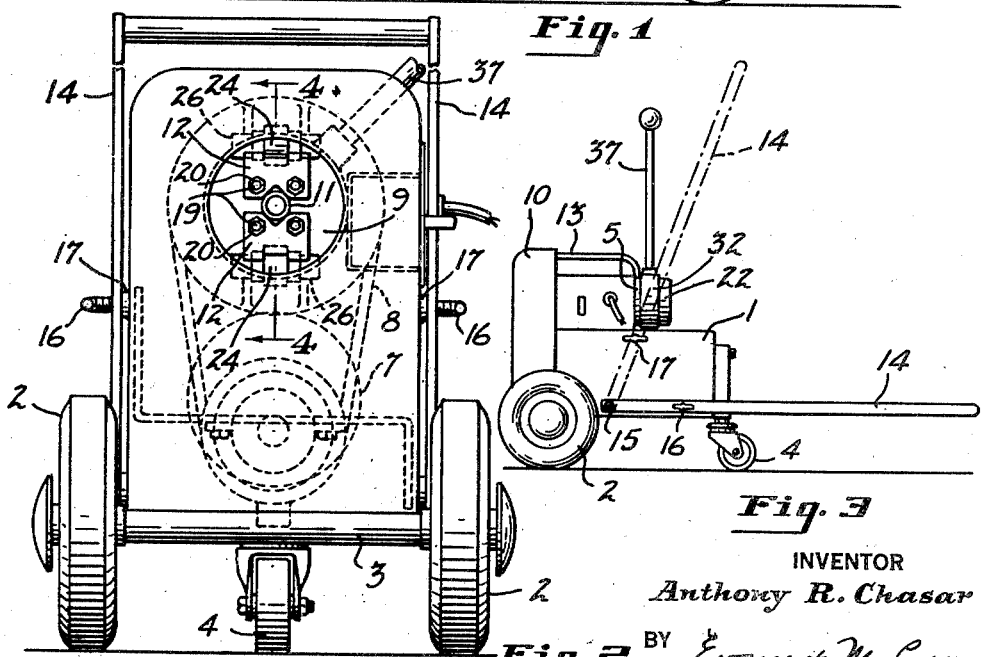
Fig. 2 is a front elevation of the power unit.
Fig. 3 is a side elevation of the power unit on a smaller scale than in Fig. 1, showing adjustments of the handle.

A handle 13 attached to the head 5 is provided for carrying the power unit when desired and a push handle 14 is provided for moving the unit back and forth on a floor surface. The handle 14 is connected to the housing 1 by a pivot 15 and carries screws 16 that engage in sockets 17 in the housing 1 which are arranged to support the handle in an inclined position such as shown in Fig. 1, or in a horizontal position such as shown in full lines in Fig. 3, the handle being mounted in the inclined position for moving the unit back and forth on a floor surface and being positioned as shown in Fig. 3 to permit the unit to be moved like a wheelbarrow when desired, the latter adjustment of the handle being convenient for moving the unit up or down a stairway.

As shown in Figs. 4 and 5, the clamping blocks 12 are each supported upon the ends of a pair of elongated rods 18, the rods 18 having forward end portions 19 of reduced diameter to receive the blocks 12 which are clamped to the rods by means of nuts 20. The rear ends of the rods 18 are rigidly attached to an annulus 21 that is externally threaded and is screwed into a supporting ring 22. The rods 18 are flexible and resilient so that their free ends, which carry the clamping blocks 12, may be flexed laterally to permit the blocks 12 to move radially into clamping engagement with a member positioned between the blocks. The two pairs of rods 18 are spaced apart within the tubular shaft 6 a distance sufficient to provide the desired spacing of the clamping blocks and may be so positioned that they normally engage the interior of the shaft.

The clamping blocks 12 have slanting outer faces 23 which converge rearwardly and these faces are engaged by driving members in the form of rollers 24 that are carried by the pulley 9. The rollers 24 are on opposite sides of the shaft axis and are mounted upon parallel shafts 25 carried by brackets 26 attached to the pulley 9. The rollers 24 have wide peripheral faces bearing upon the slanting faces 23 of the clamping blocks and hold the clamping unit against turning movements with respect to the shaft 6, the clamping unit and the member clamped between the blocks 12 being driven through the clamping blocks by the rollers 24 attached to the pulley 9.

The clamping unit that comprises the supporting ring 22, the rods 18 and the clamping blocks 12 is movable axially of the shaft 6, and axial movement of the clamping unit in the rearward direction causes radial thrust to be applied by the rollers 24 to the clamping blocks, which flexes the rods 18 and moves the blocks 12 toward clamping position. Upon release of the radial thrust on the clamping blocks the rods 18, acting as springs, return the clamping blocks 12 to their outermost positions.

The tubular shaft 6 is held against endwise movement in the head 5 and means is provided for shifting the clamping unit axially with respect to the shaft 6 to apply the clamp. The forward end of the shaft 6 is supported on a ball bearing 27 that has an inner race ring 28 that is fixed to the shaft 6 and an outer race ring 29 that is fixed to the head 5, the inner race ring 28 being positioned on the shaft 6 against the inner side of the pulley 9 and the outer race ring 29 being positioned against a ring 30 mounted in the head 5. Adjacent the rear end of the shaft 6 a cam sleeve 32 coaxial with the shaft 6 and surrounding the same is rotatably and slidably mounted in the head 5. On its forward edge the sleeve 32 has a plurality of inclined cam faces 33 of equal angular length that terminate in flat raised portions 34 and the housing 5 carries equiangularly spaced balls 35 that engage with the cam faces 33, the balls 35 being mounted in a ring 36 secured in the head 5. The cam sleeve 32 has a handle 37 attached thereto by means of which it may be turned manually and also has two lugs 38 projecting from the exterior thereof which are movable into and out of engagement with a shoulder 39 formed on the top of the housing 1. The lugs 38 limit the angular movement of the sleeve cam 32 to an angle that corresponds to the angular length of the cams 33 so that when the sleeve 32 is moved by the handle 37 from one extreme position to the other, the cams 33 are moved with respect to the balls 35 an angular distance sufficient to move the cam from a position in which the low points thereof engage the rollers 35 to a position in which the flat high points 34 of the cams engage the rollers 35, the cams imparting a predetermined axial movement to the sleeve 32 when turned through the angle permitted by the stop lugs 38.

A ball bearing 40 is interposed between the cam sleeve 32 and the shaft 6. The bearing 40 has an outer race ring 41 that is mounted in a fixed position within the sleeve 32 and an inner race ring 42 that is slidable upon the shaft 6. The bearing 40 moves axially with the sleeve 32 and slides upon the shaft 6. The ring 22 has an annular forwardly extending projection 43 that engages the rear face of the inner race ring 42. When the cam sleeve 32 is turned by means of the handle 37 the sleeve is moved rearwardly on the shaft 6 and the race ring 42 moving with the sleeve 32 exerts a rearward thrust on the ring 22 that causes the clamping unit to move rearwardly. The rearward movement of the clamping blocks 12 between the rollers 24 causes the blocks to be moved radially inwardly into engagement with the member to be clamped.

Frictional engagement of the cam sleeve 32 with the head 5 will retain the sleeve in any position to which it is turned, so that the clamping unit is retained in clamping engagement with the member gripped by the blocks 12. When the sleeve cam 32 is turned to register the low portion of the cam faces 33 with the balls 35, its rods 18 exert an outward thrust on the blocks 12 to press the inclined faces 23 against the rollers 24, which causes the clamping unit to be moved forwardly and the blocks 12 to be moved to releasing position.

The threaded engagement of the inner annulus 21 with the ring 22 permits the rods 18 and blocks 12 to be moved forwardly or rearwardly with respect to the rollers 24 to adjust the initial position of the clamping blocks so that the blocks may be positioned closely adjacent the member to be clamped so that only a small movement of the clamping unit is required to apply the clamp.

It will be apparent that the clamping device of the present invention can be actuated either while the shaft 6 is rotating or while the shaft 6 is stationary, the antifriction bearing 40 permitting free rotation of the shaft with respect to the sleeve 32 with the clamping members in either clamping or releasing position.

It is to be understood that in accordance with the provisions of the patent statutes, variations and modifications of the specific devices herein shown and described may be made without departing from the spirit of the invention.

What I claim is:

1. A clamping assembly comprising a supporting head, a tubular shaft journaled in said head, a clamping unit carried by and rotatable with said shaft, said unit comprising a supporting member, elongated flexible and resilient rods rigidly attached to said member and having free ends spaced apart and clamping blocks attached to the free ends of said rods, said supporting member being adjacent one end of said shaft, said clamping blocks being adjacent the opposite end of the shaft and said rods extending axially through said shaft, means interposed between said supporting head and said supporting member for shifting said clamping unit axially relative to said shaft, and camming means interposed between said shaft and said clamping blocks for applying a radial thrust to said blocks to move the blocks and the free ends of said rods radially in respconse to axial movement of said clamping blocks with respect to said shaft.

2. A clamping assembly comprising a supporting head, a tubular shaft journaled in said head, a clamping unit carried by and rotatable with said shaft, said unit comprising a supporting member, elongated flexible and resilient rods having ends rigidly attached to said member and having free ends spaced apart and clamping blocks attached to the free ends of said rods, said supporting member being adjacent one end of said shaft, said clamping blocks being adjacent the opposite end of the shaft and said rods extending axially through said shaft, a cam coaxial with said shaft and rotatably mounted in the head, said cam being interposed between said head and said supporting member for exerting an axial thrust on said member to move the same axially, and camming means interposed between said shaft and said clamping blocks for applying a radial thrust to said blocks to move said blocks and the free ends of said rods radially in response to axial movement of said supporting member with respect to said shaft.

3. A clamping assembly comprising a supporting head, a tubular shaft journaled in said head, a supporting member mounted to rotate about the shaft axis, elongated rods carried by said member and extending within the shaft longitudinally thereof, said rods having free ends spaced apart and being flexible and resilient to permit said free ends to move radially, clamping blocks attached to the free ends of said rods and provided with slanting outer faces that converge toward the shaft axis and that have axially extending grooves, driving members mounted on said shaft and engaging in the grooves of said slanting faces, and means including a cam interposed between said head and said supporting member for shifting said rods and clamping members axially realtive to said driving members to cause said rods to flex and said clamping blocks to move radially.

4. A clamping assembly comprising a supporting head, a tubular shaft journaled in said head and open at both ends, spaced elongated flexible and resilient rods extending longitudinally within said shaft, means including a supporting ring for supporting the rods at one end in fixed radial positions with respect to said shaft, clamping blocks attached to the opposite ends of said rods and provided with slanting outer faces that converge toward the shaft axis, driving members mounted in fixed positions on said shaft and engaging said slanting faces to hold said blocks in fixed angular positions with respect to said shaft, and means surrounding said rods and said shaft and interposed between said head and said annular ring for shifting said rods and clamping members axially relative to said members to cause said rods to flex and said clamping members to move radially.

5. A clamping assembly comprising a supporting head, an open ended tubular shaft journaled in said head, a clamping unit comprising a ring concentric with said shaft having two pairs of elongated flexible and resilient rods, each rigidly attached at one end thereto and extending axially through said shaft and a pair of opposed clamping blocks, each attached to the opposite ends of the rods of one of said pairs, manual means interposed between said head and said ring and surrounding said shaft for moving said clamping unit axially relative to said shaft, and camming means interposed between said clamping blocks and said shaft for applying radial thrusts to said clamping blocks to flex said rods and move said clamping blocks radially in response to axial movement of said clamping blocks and said ring with respect to said shaft.

6. A clamping assembly comprising a supporting head, a tubular shaft journaled in said head, a clamping unit comprising a ring having two pairs of elongated flexible and resilient rods, each rigidly attached at one end thereto and extending axially through said shaft and a pair of opposed clamping blocks, each attached to the opposite ends of the rods of one of said pairs, said clamping blocks having slanting outer faces, driving members attached to said shaft and engaging said slanting faces, and means for moving said clamping unit axially with respect to said shaft to cause said rods to flex and said clamping members to move radially.

7. A clamping assembly comprising a supporting head, an open ended tubular shaft journaled in said head and held against endwise movement therein, a ring coaxial with the shaft and rotatably supported at one end thereof, elongated flexible and resilient rods rigidly attached to said ring and extending axially through said shaft, said rods being spaced apart and having free ends beyond the opposite end of said shaft, clamping blocks attached to the free ends of said rods and provided with slanting outer faces that converge toward the shaft axis, driving members mounted on said shaft for rotation therewith and engaging said slanting faces to prevent angular movements of said blocks with respect to said shaft, and means interposed between said head and said ring for shifting said ring, rods and clamping members axially of said shaft and relative to said driving members to cause said rods to flex and said clamping members to move radially.

8. A clamping assembly comprising a supporting head, an open ended tubular shaft journaled in said head and held against endwise movement therein, a ring coaxial with the shaft and rotatably supported at one end thereof, elongated flexible and resilient rods rigidly attached to said ring and extending axially through said shaft, said rods being spaced apart and having free ends beyond the opposite end of said shaft, clamping blocks attached to the free ends of said rods and provided with slanting outer faces that converge toward the shaft axis, driving members mounted on said shaft and engaging said slanting faces, means for adjusting said rods axially of said ring to adjust the initial positions of said clamping members, and means for shifting said ring, rods and clamping members axially of said shaft and relative to said driving members to cause said rods to flex and said clamping members to move radially.

9. A clamping assembly comprising a supporting head, an open ended tubular shaft journaled in said head and held against endwise movement therein, a ring coaxial with the shaft and rotatably supported at one end thereof, elongated flexible and resilient rods rigidly attached to said ring and extending axially through said shaft, said rods being spaced apart and having free ends beyond the opposite end of said shaft, clamping blocks attached to the free ends of said rods and provided with slanting outer faces that converge toward the shaft axis, driving members mounted on said shaft for rotation therewith and engaging said slanting faces to prevent angular movement of the blocks with respect to the shaft, and a manually operable cam interposed between said ring and said head for shifting said ring, rods and clamping members axially relative to said driving members to cause said rods to flex and said clamping members to move radially.

10. A clamping assembly comprising a supporting head, a tubular open ended shaft journaled in said head and held against endwise movements therein, a sleeve rotatably and slidably mounted on said head and surrounding said shaft, cam members carried by said sleeve and said head for moving the sleeve axially upon turning movements thereof, a ball bearing interposed between said sleeve and shaft, said bearing having an outer race ring mounted in said sleeve and movable therewith and an inner race ring slidable on said shaft, a supporting ring engaging said inner race ring and projecting beyond an end of said shaft, rods rigidly attached to said supporting ring and extending longitudinally within said shaft, said rods being flexible and resilient and having spaced free ends, clamping blocks attached to the free ends of said rods, and camming means interposed between said clamping blocks and said shaft for imparting radial movements to said clamping members upon axial movements thereof.

11. A clamping assembly comprising a supporting head, a tubular open ended shaft journaled in said head and held against endwise movements therein, a sleeve rotatably and slidably mounted on said head and surrounding said shaft, cam members carried by said sleeve and said head for moving the sleeve axially upon turning movements thereof, a ball bearing interposed between said sleeve and shaft, said bearing having an outer race ring movable with the sleeve and an inner race ring slidable on said shaft, a supporting ring engaging said inner race ring and projecting beyond an end of said shaft, rods rigidly attached to said supporting ring and extending longitudinally within said shaft, said rods being flexible and resilient and having spaced free ends, driving members mounted in fixed position on said shafts, and clamping blocks attached to the free ends of said rods and having slanting outer faces that converge toward said supporting ring and that engage said driving members to cam said clamping blocks radially inwardly upon an axial movement of said supporting ring away from said driving members.

12. A clamping assembly comprising a supporting head, a tubular open ended shaft journaled in said head and held against endwise movements therein, a sleeve rotatably and slidably mounted on said head and surrounding said shaft, cam members carried by said sleeve and said head for moving the sleeve axially upon turning movements thereof, a ball bearing interposed between said sleeve and shaft, said bearing having an outer race ring movable with the sleeve and an inner race ring slidable on said shaft, a supporting ring engaging said inner race ring and projecting beyond an end of said shaft, said supporting ring comprising an outer internally threaded annulus and an inner externally threaded annulus screwed into the outer annulus and axially adjustable with respect thereto, rods rigidly attached to said inner annulus and extending longitudinally within said shaft, said rods being flexible and resilient and having spaced free ends, driving members mounted in fixed position on said shaft, and clamping blocks attached to the free ends of said rods and having slanting outer faces that converge toward said supporting ring and that engage said driving members to cam said clamping blocks radially inwardly upon an axial movement of said supporting ring away from said driving members.

13. A clamping assembly comprising a supporting head, an open ended tubular shaft journaled in said head and held against endwise movement therein, brackets attached to said shaft and projecting past an end thereof, said brackets being on opposite sides of the shaft axis and having parallel shafts, a roller on each of said shafts, a pair of opposed clamping blocks having oppositely slanting outer faces engaging said rollers, a supporting member overlying the opposite end of said shaft, two pairs of elongated resilient and flexible rods extending longitudinally through said shaft, said rods being rigidly connected at one end to said supporting member, the rods of one pair being rigidly attached to one of said clamping blocks and the rods of the other pair being rigidly attached to the other clamping block, and a cam interposed between said supporting member and said head for moving said supporting member, rods and clamping members axially.

14. A clamping assembly comprising a supporting head, an open ended tubular shaft journaled in said head and held against endwise movement therein, brackets attached to said shaft and projecting past an end thereof, said brackets being on opposite sides of the shaft axis and having parallel shafts, a roller on each of said shafts, a pair of opposed clamping blocks having oppositely slanting outer faces engaging said rollers, a supporting member overlying the opposite end of said shaft, two pairs of elongated resilient and flexible rods extending longitudinally through said shaft, said rods being rigidly connected at one end to said supporting member, the rods of one pair being rigidly attached to one of said clamping blocks and the rods of the other pair being rigidly attached to the other clamping block, a sleeve slidably and rotatably mounted on said head, said sleeve surrounding said shaft adjacent said supporting member, a handle attached to said sleeve, stops limiting turning movements of said sleeve, cam members on said sleeve and said housing for imparting an axial movement to said sleeve upon a turning movement thereof, and an antifriction bearing interposed between said sleeve and said supporting member through which axial thrust is transmitted from said sleeve to said supporting member to move said supporting member, rods and clamping member axially.

15. A clamping assembly comprising a supporting head, an open ended tubular shaft journaled in said head and held against endwise movement therein, a driving pulley attached to one end of said shaft, two outwardly projecting brackets on said pulley that are disposed on opposite sides of the shaft axis, rollers mounted on said brackets to turn about parallel axes, two clamping blocks between said rollers, said blocks having oppositely slanting outer faces engaging said rollers and converging toward the adjacent end of said shaft, elongated, flexible and resilient rods rigidly attached to said blocks and extending longitudinally through said shaft, said rods normally contacting the interior of said shaft, a supporting ring to which the opposite ends of said rods are rigidly attached, said supporting ring projecting past the periphery of said shaft, a sleeve surrounding said shaft adjacent said supporting ring, said sleeve being slidably and rotatably mounted on said head, means for moving said sleeve axially to shift said supporting member, rods and clamping blocks, and an antifriction bearing interposed between said sleeve and said supporting ring.

16. A clamping assembly as defined in claim 6 wherein said tubular shaft is open at both ends and is held against endwise movement in said head, said ring is coaxial with said shaft and rotatably and slidably mounted on said head at one end of said shaft, and said rods are spaced apart and have free ends extending beyond an end of said shaft to which said clamping blocks are attached.

17. A clamping assembly as defined in claim 8 wherein the means for shifting said ring comprises a manually operable cam interposed between said ring and said supporting head and mounted for rotation about the axis of said shaft.

18. A clamping assembly as defined in claim 10 wherein said camming means comprises driving members mounted in fixed position on said shafts and clamping blocks attached to the free ends of said rods, said blocks having slanting outer faces that converge toward said supporting ring and that engage said driving members to cam said clamping blocks radially inwardly upon an axial movement of said supporting ring away from said driving members.

19. A clamping assembly comprising a supporting frame, an open ended tubular shaft journaled in said frame and held against endwise movement therein, a clamping unit carried by and rotatable with said shaft, said unit comprising a supporting member slidably mounted on said head for rotation about the shaft axis and having an opening therethrough that is axially alined with the shaft, elongated flexible and resilient rods having ends rigidly attached to said member radially outwardly of said opening and having free ends spaced apart radially outwardly of the shaft axis and clamping blocks attached to the free ends of said rods, said supporting member being adjacent one end of said shaft and supporting the other ends of said rods in fixed radial positions with respect to the axis of said shaft, said clamping blocks being adjacent the opposite end of the shaft and said rods extending axially through said shaft, a cam coaxial with and surrounding said shaft and rotatably mounted in the head for rotation about the axis of said shaft, said cam being interposed between said head and said supporting member for exerting an axial thrust on said member to slide the same axially, and camming means interposed between said shaft and said clamping blocks for applying a radial thrust to said blocks to move the blocks and the free ends of said rods radially in response to axial movement of said blocks with respect to said shaft.

20. A clamping assembly comprising a supporting head, a tubular shaft journaled in said head and open at both ends, a clamping unit rotatable with said shaft, said unit comprising a supporting member mounted on said head adjacent one end of said shaft for rotation about the shaft axis and having an opening therethrough that is axially alined with the shaft, elongated flexible and resilient rods having ends rigidly attached to said member radially outwardly of said opening and having free ends spaced apart radially outwardly of the shaft axis and clamping blocks attached to the free ends of said rods, said clamping blocks being adjacent the opposite end of the shaft and said rods extending axially through said shaft, means including a cam carried by said head radially outwardly of said shaft for shifting said clamping unit axially relative to said shaft, and camming means interposed between said shaft and said clamping blocks for applying a radial thrust to said blocks to move the blocks and the free ends of said rods radially in response to axial movement of said blocks with respect to said shaft.

References Cited in the file of this patent

UNITED STATES PATENTS

| Number | Name | Date |
|---|---|---|
| 323,727 | Peavey | Aug. 4, 1885 |
| 589,608 | Mohr | Sept. 7, 1897 |
| 2,153,971 | Montgomery | Apr. 11, 1939 |
| 2,253,990 | Speed | Aug. 26, 1941 |
| 2,261,380 | Jelinek et al. | Nov. 4, 1941 |
| 2,493,926 | Petsche | Jan. 10, 1950 |